UNITED STATES PATENT OFFICE.

GEORGES DE LAIRE, OF PARIS, FRANCE.

PROCESS OF MAKING COMPOUNDS OF ISOEUGENOL.

SPECIFICATION forming part of Letters Patent No. 457,864, dated August 18, 1891.

Original application filed December 3, 1890, Serial No. 373,429. Divided and this application filed March 20, 1891. Serial No. 385,720. (No specimens.) Patented in England November 1, 1890, No. 17,547.

*To all whom it may concern:*

Be it known that I, GEORGES DE LAIRE, a citizen of the French Republic, and a resident of Paris, France, have invented certain Improvements in the Preparation of Monomolecular Derivatives, with Radicals of Organic Acids, from Isoeugenol, (for which a patent has been granted in Great Britain, No. 17,547, dated November 1, 1890,) of which the following is a specification.

My invention relates, as its title indicates, to the preparation of monomolecular derivatives from isoeugenol, one of the ultimate objects being the preparation from said derivatives of the substance called "vanillin."

The method I prefer to employ in preparing isoeugenol from eugenol, or the essence of cloves, is set forth in another application of mine, (Serial No. 373,429,) of which this application is a division.

When the radical of an organic acid—such as acetic, propionic, butyric, valerianic, benzoic, &c., acid—is substituted for the hydrogen of the phenylhydroxyl group of isoeugenol, the acetyl, propionyl, butyl, valeral, benzoyl, &c., derivatives thus obtained produce vanilline after oxidation, and on the condition of having been prepared in a certain manner. In studying thoroughly this reaction I have ascertained that according to the process employed in substituting the radical of an organic acid for the hydrogen of the phenyl group I obtain either monomolecular derivatives of isoeugenol or polymeric derivatives. This remark is essential, because the two classes of derivatives behave in quite a different manner during their oxidation. The polymeric derivatives of isoeugenol only give traces of vanillin, while the monomolecular derivatives alone give industrial quantities of vanillin. This essential fact, which is to be stated precisely, has not been indicated even scientifically, so far as I am aware, until now. The benzoyl derivative of isoeugenol prepared by Tiemann & Kraaz, and which melts at 159° to 160° centigrade, constitutes a polymeric and not a monomolecular derivative, as is proven by the determination of its molecular weight.

The monomolecular derivatives with radicals of organic acids are obtained when isoeugenol is heated with the anhydrides of organic acids, or when the alkaline salts of isoeugenol in alkaline solution are shaken with the chlorides of organic acids. On the contrary, when isoeugenol is heated with the chlorides of organic acids, the product is always polymeric.

The operation is effected in the following manner, according to my invention: A mixture of isoeugenol and anhydrous acetic acid having the same molecular weight is heated and brought to a temperature of about 135° centigrade, maintained for four or five hours. The reaction having then finished, the mixture is left to rest until it is entirely cooled. The product thus obtained is washed in slightly alkaline water. The acetyl isoeugenol crystallizes easily, melting at 79° to 80° centigrade.

The operation may also be effected as follows: Ten parts of isoeugenol are dissolved in a diluted solution of hydrate of soda, to which is added by degrees and with a vigorous shaking fifteen parts of chloride of benzoyl, observing that the liquor remains alkaline and does not get too warm. The benzoyl isoeugenol separates and may be collected by decantation. It melts at 103° to 104° centigrade.

Having thus described my invention, I claim—

1. The herein-described method of preparing monomolecular derivatives of isoeugenol, which consists in combining the isoeugenol with an organic anhydride acid, as set forth, whereby the radical of the acid is caused to react on the isoeugenol, substantially as set forth.

2. The herein-described method of preparing the monomolecular derivatives of isoeugenol, which consists in heating an alkaline salt of isoeugenol in alkaline solution with an anhydride chloride of an organic acid, whereby the radical of said acid is caused to react on the isoeugenol, substantially as set forth.

In witness whereof I have hereunto signed my name in the presence of two subscribing witnesses.

GEORGES DE LAIRE.

Witnesses:
 JULES ARMENGAUD, Jeune,
 ROBT. M. HOOPER.